US007962977B1

(12) United States Patent
Ami et al.

(10) Patent No.: US 7,962,977 B1
(45) Date of Patent: Jun. 21, 2011

(54) SYSTEM, METHOD, AND COMPUTER PROGRAM PRODUCT FOR DETERMINING A PRICE UTILIZING A PATTERN ORIENTED RULE IMPLEMENTED TABLE

(75) Inventors: Shahar Ben Ami, Hod H'asharon (IL); Boris Potyomkin, Ramat Gan (IL); Moshe Recanati, Givat Shmuel (IL); Ran Gafni, Givataim (IL); Vered Domankevich, Hod H'asharon (IL)

(73) Assignee: Amdocs Software Systems Limited, Dublin (IE)

( * ) Notice: Subject to any disclaimer, the term of this patent is extended or adjusted under 35 U.S.C. 154(b) by 870 days.

(21) Appl. No.: 11/755,653

(22) Filed: May 30, 2007

Related U.S. Application Data

(60) Provisional application No. 60/826,886, filed on Sep. 25, 2006.

(51) Int. Cl.
*G06Q 99/00* (2006.01)
(52) U.S. Cl. ............... 5/400; 705/1.1; 705/26; 705/400; 704/1; 709/203; 707/151
(58) Field of Classification Search ............... 705/1, 26, 705/1.1, 400; 709/203; 704/1; 706/46, 56; 1/1; 717/151
See application file for complete search history.

(56) References Cited

U.S. PATENT DOCUMENTS

| | | | | |
|---|---|---|---|---|
| 6,985,900 | B2 * | 1/2006 | Codd et al. | 706/56 |
| 7,343,325 | B2 * | 3/2008 | Shaver et al. | 705/26 |
| 7,461,042 | B2 * | 12/2008 | Long et al. | 706/46 |
| 7,672,960 | B2 * | 3/2010 | Anonsen | 1/1 |
| 2005/0027507 | A1 * | 2/2005 | Patrudu | 704/1 |
| 2005/0262194 | A1 * | 11/2005 | Mamou et al. | 709/203 |
| 2007/0011668 | A1 * | 1/2007 | Wholey et al. | 717/151 |

OTHER PUBLICATIONS

"Emerald Technologies Certified to Provide Implementation Services for pcOrder's eStation Technology and Applications", Mar. 16, 2000, PR Newswire: NY, p. 1, (2pgs.*

* cited by examiner

*Primary Examiner* — John W Hayes
*Assistant Examiner* — Freda A Nelson
(74) *Attorney, Agent, or Firm* — Zilka-Kotab, PC

(57) ABSTRACT

In use, parameter representing pricing logic is defined in a pattern oriented rule implementation table/(s) and is applied utilizing a rule. Each rule may return a result according to a set of condition-value expressions pairs. Code is generated for determining a price, based on the rule. In various embodiments, the order of the code may be optimized when generated. Given a parameter name, the code may be executed for determining the price in an event scope.

14 Claims, 7 Drawing Sheets

| DOMAIN | PARAMETER | VALUE | CONDITION | ORDER | SIDE EFFECT |
|---|---|---|---|---|---|
| --- | --- | --- | --- | --- | --- |
| <EXPRESSION> | <EXPRESSION> | <EXPRESSION> | <EXPRESSION> | <EXPRESSION> | <EXPRESSION> |

US 7,962,977 B1

SYSTEM, METHOD, AND COMPUTER PROGRAM PRODUCT FOR DETERMINING A PRICE UTILIZING A PATTERN ORIENTED RULE IMPLEMENTED TABLE

RELATED APPLICATION(S)

This application claims priority of a provisional application filed Sep. 25, 2006 under application Ser. No. 60/826,886, which is incorporated herein by reference in its entirety for all purposes.

FIELD OF THE INVENTION

The present invention relates to software, and more particularly to software for implementing pricing algorithms. A system, method, and computer program product are provided for determining a price. In use, parameter representing pricing logic is defined in a pattern oriented rule implementation table/(s) and is applied utilizing a rule. Each rule may return a result according to a set of condition-value expressions pairs. Code is generated for determining a price based on the rule. In various embodiments, the order of the code may be optimized when generated. Given a parameter name, the code may be executed for determining the price in an event scope.

A rule execution graph may be determined according to pre-defined logic. Further, an execution graph may be also determined during runtime by rule name manipulation. Rule version may be determined during runtime according to event date. During rule execution, invocation of certain logic may be done in O(1) and a rule result may be cached. Further, pre-/post-side effects may accompany rule's execution before or after the return command. Further, each rule may also be used as a function with arguments that are relevant in the rule scope. In addition, inheritance between rules may enable logic reusability. Still yet, a rule may serve as an exit point to external code gaining complete flexibility.

DETAILED DESCRIPTION

Figure 1:
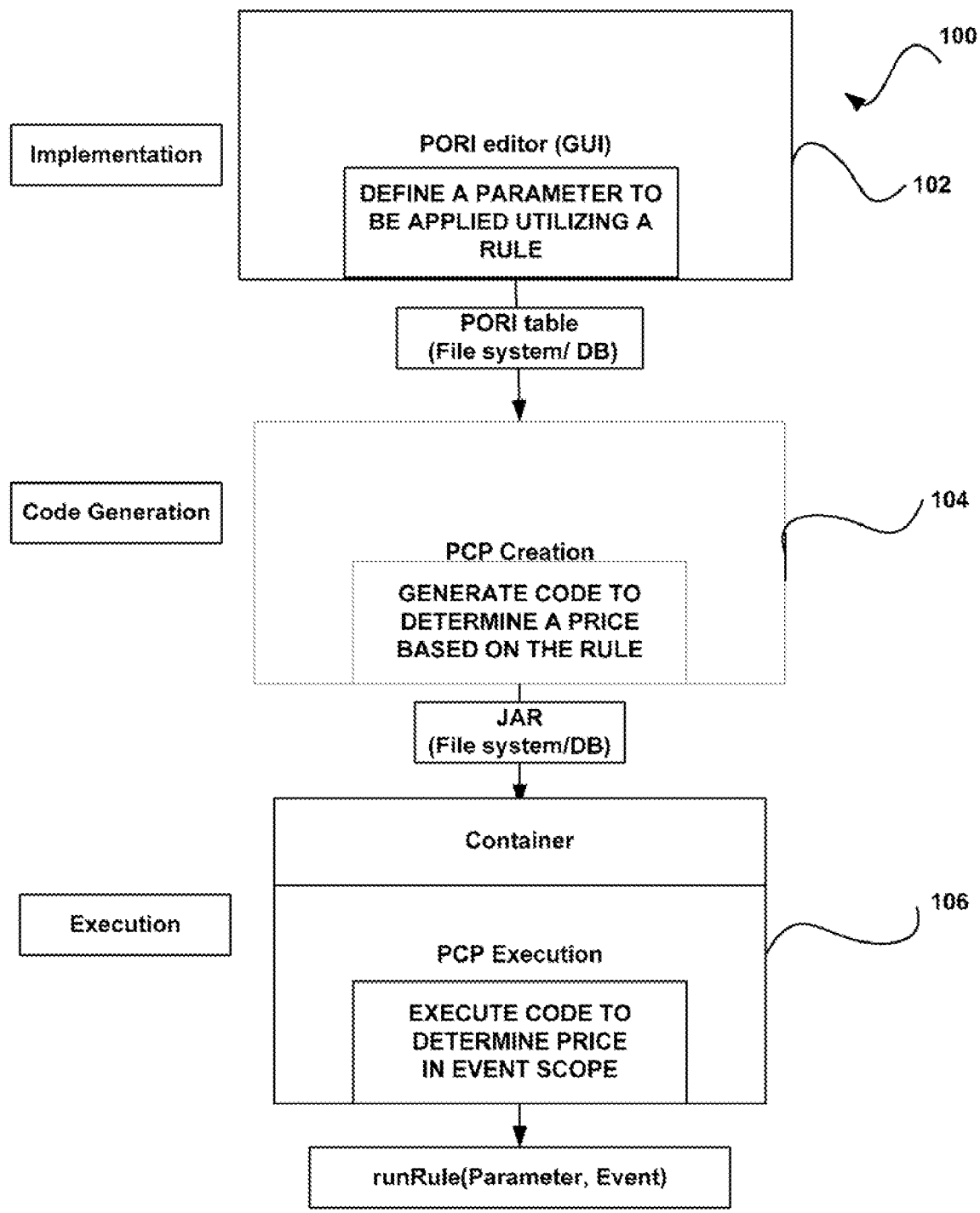
FIG. 1 shows a method for determining a price, in accordance with one embodiment.

FIG. 1 illustrates a method for determining a price 100, in accordance with one embodiment. As shown in operation 102, a parameter is defined. In the context of the present description, the parameter refers to any constant, variable, characteristic, factor, aspect, and/or element that is capable of being applied utilizing a rule. Further, such rule may refer to any logic capable of being applied to the parameter. More exemplary information regarding such rule, parameter, etc. will be set forth later during reference to subsequent embodiments.

Further, such rule may be defined in a variety of ways. For example, any manual and/or automatic technique for receiving the parameter may be employed. In one embodiment, the rule may be one of a set of internal business rules, for example. In another embodiment, the rule may be included in a table containing a plurality of rules. For example, such a table may be provided for implementing the rule. In one possible embodiment, the table may thus include a pattern oriented rule implementation (PORI) table.

More illustrative information regarding such PORI table will be set forth later during reference to subsequent embodiments. Parameter definition during implementation time may use, in one embodiment, a GUI editor. Further, the PORI table may be saved, in one embodiment, in a file (e.g. CSV or TXT file, etc.) in the file system or, in other embodiments, a table in a database.

Further, as shown in operation 104, after the parameter has been defined, code is generated for determining a price, based on the rule. Such code may be generated in a variety of ways. For example, in one embodiment, such code may be generated using a template methodology, and a JAR containing the pricing logic may be created. In one embodiment, the JAR may be stored in the database or, in another embodiment, in the file system. In one embodiment, code may be generated according to the rule(s) defined in the PORI table using a PORI Core Processor (PCP). More exemplary information regarding such processor will be set forth later during reference to subsequent embodiments Further, in operation 106, the code is executed to determine the price. Such code may be executed in a variety of ways. For example, in one embodiment, such code may be executed by software container running on any platform, such as AIX, UNIX, WINDOWS, and MAINFRAME, for example. Rules that were defined containing the pricing logic, can be then called and executed, given the parameter name and input data organized in the event structure. Of course, the code generation of operation 104 and the code execution of operation 106 may or may not be carried utilizing the same system.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
FIG. 2 shows a pattern oriented rule implementation (PORI) table for representing pricing schemes, in accordance with one embodiment.

FIG. 2 shows a PORI table 200 for representing pricing schemes, in accordance with one embodiment. As an option, PORI table 200 may be used in the context of the details of FIG. 1. Of course, however, the PORI table 200 may be used in any desired environment. Further, the aforementioned definitions may equally apply to the description below.

In the context of the current embodiment, the PORI table 200 may be used for representing pricing schemes. For example, the PORI table 200 may be used to represent logic adapted for concluding a price or set of prices on a given event. In use, a processor [e.g. PORI core processor (PCP)] may be used for execution of the logic associated with the PORI table based on optimized generated Java code, for example. The PORI table 200, in conjunction with the processor, provides a way to calculate a price and enables calculation of complicated pricing in a real-time manner.

In one embodiment, the PORI table 200 may include a data structure for representing algorithms to determine a price or set of prices on any financial transaction, for example. The PORI table 200 may also be used to describe the pricing logic associated with an input event as described by a set of expressions (e.g. see FIG. 2).

Each row in the PORI table 200 may be regarded as a "PORI STATEMENT" in the target domain. The value of the "PARAMETER EXPRESSION" may be set according to the "VALUE EXPRESSION" if the "CONDITION EXPRESSION" equals TRUE, for example. In addition, the "ORDER EXPRESSION" may be evaluated and transformed into a valid number, which determines the order of execution.

A set of "STATEMENTS" with the same "PARAMETER" name may be regarded as a "RULE," in the present embodiment. For a "RULE" with only one "STATEMENT," the "CONDITION EXPRESSION" and the "ORDER EXPRESSION" are redundant. Thus, these expressions may be optional, in one embodiment.

Further, in the present embodiment, the PORI STATEMENTS may resemble functional language. For example, in one embodiment, a parameter name may or may not include input parameters. For instance, "interest" or "futureValue(x, y)" may be used, and x and y may be used locally in the rule scope. Additionally, the rule "body" may use other rules. Similarly, a function may call another function. In addition, the return value of a PORI rule is the result of the "VALUE" logic in a case where the condition associated with the "VALUE" is true.

In one embodiment, the PORI table 200 may enable one to define a "SIDE EFFECT" before ("PRE") or after ("POST") the return operation. Additionally, in one embodiment, a domain-specific language may be provided for describing business logic associated with financial pricing in the PORI table 200. Using the PORI core processor, such logic may be transformed into optimized code. In the PORI table 200, business analysts may reuse a PORI STATEMENT or set of STATEMENTs in an object-oriented fashion, in accordance with one embodiment. Thus, inheritance of DOMAINs enables automatic usage of the rules that are defined in the father domain.

It should be noted that reusability may, in one embodiment, be intrinsic to the PORI representation language because a block of pricing logic represented as a "DOMAIN EXPRESSION" may be encapsulated and inherited. In addition, in one embodiment, each element in the PORI rule may invoke access to another PORI rule, enabling the same PORI rule to be invoked from several calling PORI rules (i.e. adding a new rule to the PORI table is like adding a new word to the developed pricing language, etc.). This representation method may create an execution graph that is determined prior to runtime according to the business logic, for example. In one embodiment, a path in such graph may be modified during runtime using dynamic (late-binding) string manipulations on the rule name.

For example, the rule value may contain the expression 'eval(ruleName+"fee").' In this context, "ruleName" may refer to another PORI rule. Furthermore, the rule may be executed during runtime and may return a string such as "ATM" or "CHECKBOOK" under certain conditions. For example, if the result was "ATM," the rule "ATM Fee" may be executed.

Further, in one embodiment, the rule language may be based on a natural-like language (e.g. >, <, AND, OR, %, etc.). Additionally, in one embodiment, the user may develop external libraries that may be used from the PORI table 200 (e.g. for financial functions, mathematical functions, database and file manipulation functions, etc.).

Furthermore, in one embodiment, the PORI table language may provide a method to expand the basic Java language simply by adding rules to a standard text file (e.g. a CSV file). In one embodiment, multiple instances of PORI tables may be implemented by parallel business analyst teams and then integrated, based on a multiple PORI table system, for example. In addition, versioning can be defined in the rule level and in the table level by effective and expiration date expressions, enabling execution of rules according to the event date.

While the PORI table 200 may be used for financial pricing representation of any pricing problem, another aspect of the present embodiment involves the PCP. In one embodiment, such PCP may include an engine that is used for generating optimized inline Java code and running PORI rules. Usage of such PCP enables separation between the pure business logic and the code that executes it. Thus, business analysts may use the PORI system to define any business logic without "worry" about code generation and execution. Every change in the business logic may be accomplished by changing the PORI table, for example. Additionally, the code may be updated automatically.

It should be noted that, in one embodiment, each PORI rule may be represented by a pure Java class which implements the corresponding rule logic. Further, in another embodiment, the rule Java classes may be generated automatically from the PORI table 200 using any desired template methodology.

Additionally, the PORI table 200 may be represented by an in-memory data structure that maps each rule to the generated Java class, for example. In one embodiment, this data structure may be an automatically generated array. Further, the size of the array may be defined by the number of PORI rules (e.g. unique PARAMETER data), in accordance with one embodiment.

As an option, each array cell may contain a reference to a Java rule instance. In another embodiment, the code generation may provide optimum performance capabilities by enabling rule language parsing as a pre-runtime process. Further, the next rule determination logic may already exist in the generated code. Thus, a search for a required rule may be based on array retrieval. Additionally, input data of the pricing request may be sent by a user during runtime.

In accordance with one embodiment involving the aforementioned ATM Fee rule, the business logic of the ATM Fee rule may be represented by the PORI table 200 shown in Table 1, for example. It should be noted that Table 1 is set forth for illustrative purposes only and should not be construed as limiting in any manner whatsoever.

TABLE 1

| DOMAIN | PARAMETER | VALUE | CONDITION | ORDER | SIDE EFFECT |
|---|---|---|---|---|---|
| ATM Pricing | ATM Fee | 0.7 | Event Customer Wealth > 100,000 | OVERRIDE | POST: writeToLog(result) |
| ATM Pricing | ATM Fee | 0.6 | (ATM is in Europe OR customer is VIP) AND Minimum amount | OVERRIDE | POST: writeToLog(result) |

TABLE 1-continued

| DOMAIN | PARAMETER | VALUE | CONDITION | ORDER | SIDE EFFECT |
|---|---|---|---|---|---|
| ATM Pricing | ATM Fee | Default ATM fee | drawn | OVERRIDE | POST: writeToLog(result) |
| ATM Pricing | ATM is in Europe | True | Europe states contains Event state | OVERRIDE | |
| ATM Pricing | ATM is in Europe | False | | OVERRIDE | |
| ATM Pricing | Customer is VIP | True | Event Customer Type = "VIP | OVERRIDE | |
| ATM Pricing | Customer is VIP | Fake | | OVERRIDE | |
| ATM Pricing | Minimum amount drawn | True | Event Amount > 50 | OVERRIDE | |
| ATM Pricing | Minimum amount drawn | False | | OVERRIDE | |
| ATM Pricing | Default ATM fee | 0.9 | | OVERRIDE | |

As mentioned earlier, each line in the table may be a PORI STATEMENT. In the present embodiment, the ATM Fee rule has three statements, two conditional statements, and one (last) default statement. Further, the rules may retrieve the input data from an event map. For instance, a customer type may be given in an input event map of a run command of the ATM Fee rule.

In one embodiment, the PORI core processor may resolve conflicts, assure deterministic execution, and optimize the order of code, all resulting from the "ORDER EXPRESSION." For example, in Table 1, the OVERRIDE word may be interpreted as a descending order of the code (i.e. the first statement is executed first, etc.).

Figure 3:
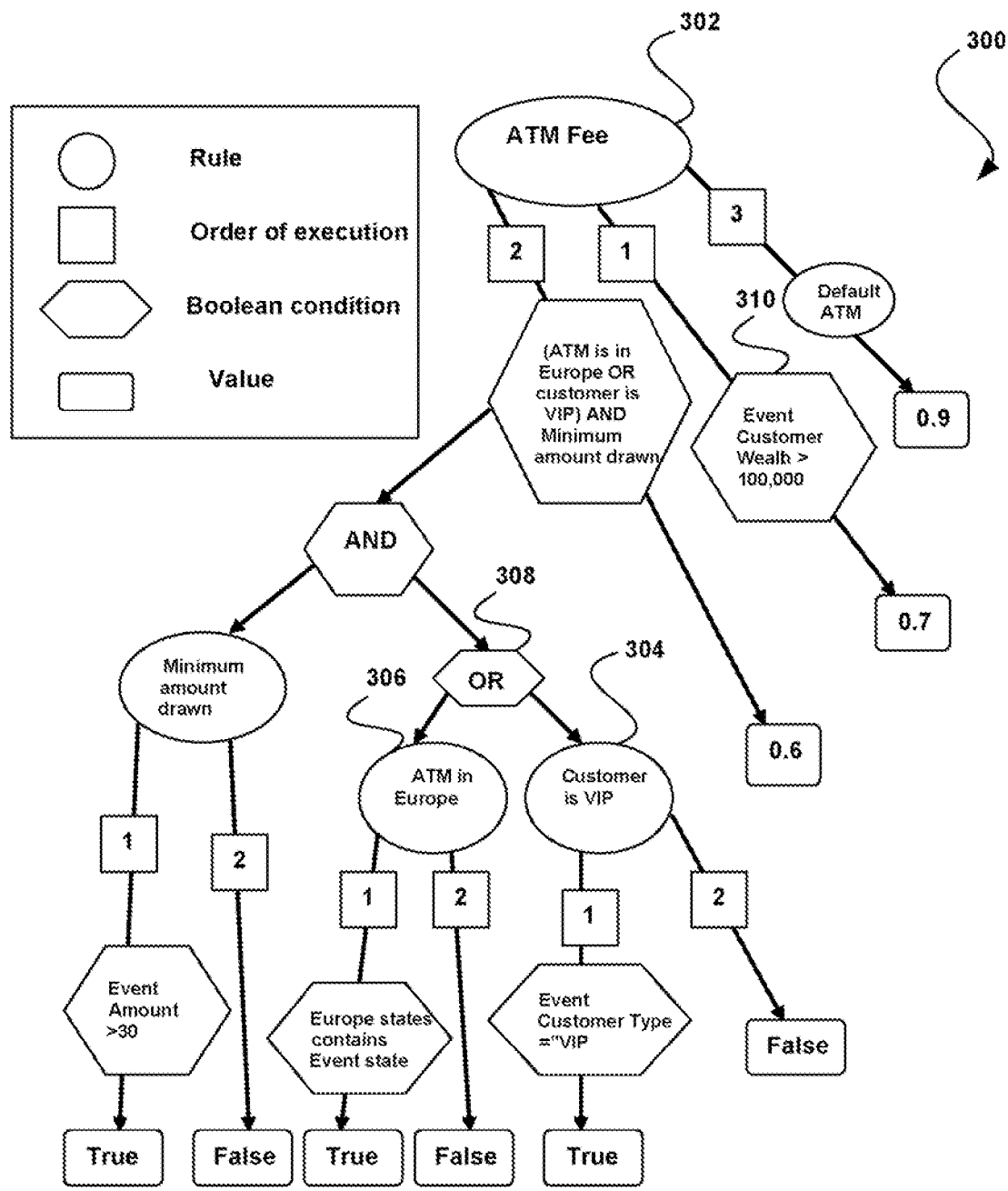
FIG. 3 shows a flow diagram illustrating logic corresponding to a PORI table, in accordance with one embodiment.

FIG. 3 shows a flow diagram 300 illustrating logic corresponding to a PORI table, in accordance with one embodiment. As an option, the flow diagram 300 may represent logic dictated by the details set forth in the PORI table provided in Table 1. Further, the aforementioned definitions may equally apply to the description below.

In the context of FIG. 3, the first rule that is called is an ATM Fee rule 302. As shown, during the calculation of this rule, other rules are called recursively. For example, in the first condition, a customer VIP rule 304 is called. A result of such customer VIP rule 304 (after its execution) is logically joined to the result of an ATM in Europe rule 306 to calculate the result of an OR operation 308. Another example is the recursive calculation of the default ATM fee rule 302, as shown in the flow diagram 300.

Furthermore, in one embodiment, the code generated for the ATM Fee rule 302 may be represented in the pseudo code illustrated below in Table 2, for example.

TABLE 2

If ( Event Customer Wealth > 100,000)
   Return 0.6
If ((ATM in Europe OR customer is VIP) AND Minimum amount drawn)
   Return 0.7
Return Default ATM fee;

Additionally, in one embodiment, the code generated for the Customer is VIP rule 304 may be represented in the pseudo code illustrated below in Table 3, for example.

TABLE 3 if( Event Customer Type ="VIP")
   Return true
   Return false;

Additionally, in one embodiment, the code generated for an Event Customer Wealth rule 310 may be represented in the pseudo code illustrated below in Table 4, for example.

TABLE 4

Return EventMap.get("(Customer Wealth");

It should be noted that the preceding information set forth in Tables 1-4 and FIG. 3 is provided for illustrative purposes only and should not be construed as limiting in any manner. Any of the preceding features may be optionally incorporated with or without the exclusion of other features described.

It should also be noted that, in one embodiment, access to each rule during the calculation may be done in O(1) due to the generation-time mapping between rule call and a final number in the rules array.

Further, in other embodiments, additional optimization features may also be applied in the PORI representation. For example, rule result caching may be used. In such case, rule results may be cached for rules that were calculated during the event run scope. As a result, if the rule is called again in the scope of the same event, the rule will not necessarily be calculated twice.

Additionally, in one embodiment, Boolean condition optimization may be provided. If Boolean condition optimization is provided, the Boolean statements that are part of the condition expression may be optimized, utilizing the odds and cost of each Boolean statement.

Additionally, in one embodiment, an optimization algorithm may rearrange the Boolean statement code generation according to two principles. First, statements with greater odds to return may be checked first. Second, statements with greater costs may be checked last, for example.

For instance, let "A" "B" and "C" be Boolean statements. To explain the cost consideration, the statement "A or C" may be examined. Considering the cost of "A or C," if A is a heavy operation in the database, the best order may be "C or A," because if C is true, A check may be skipped. Considering the odds of "A or C" to return true, it may be best to check A first, if the probability for it to be true is larger (because if A is true, B will not be checked). In the case of AND statements like "A and B," it may be better to check A first if the probability for it to be true is smaller, because if A is false, B check may be skipped.

In addition, the Boolean condition algorithm may receive the condition to be optimized and, in turn, return the condition in its cheapest representation of a disjunctive normal form (DNF). For example, for the statement C&(A|B), the DNF may be C&A|C&B. According to this optimization, the Boolean condition code may be generated and the execution order may be determined. Additionally, the optimization may be accomplished according to the given cost and odds as described in further detail below. For example, the order of the Boolean condition mentioned above: "(ATM is in Europe OR customer is VIP) AND Minimum amount drawn" can be rearranged in the generated java code according to the associated cost and odds to them.

An exemplary algorithm will now be set forth that finds the cheapest execution order of a Boolean statement. In one embodiment, the algorithm may be utilized for decision-making, such as determining whether a new employee has passed an interview, for example.

Figure 4:
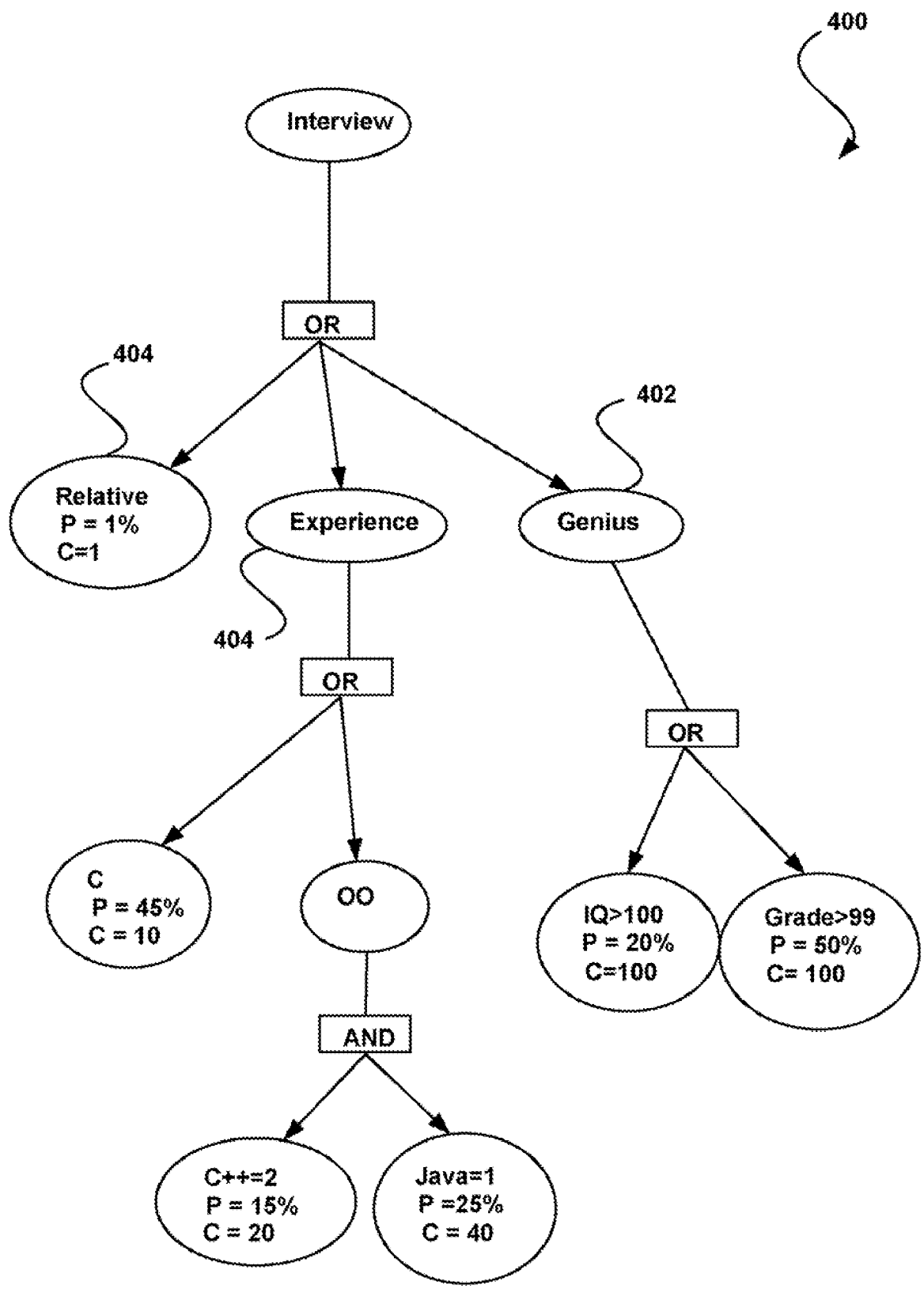
FIG. 4 shows a flow diagram, in accordance with another embodiment.

FIG. 4 shows a flow diagram 400, in accordance with one embodiment. As shown in the flow diagram 400, the business logic involves passing an interview and requires that the person will be a genius 402, will have experience 404, or will be a relative 406 (e.g. of the boss, etc.). As shown in the flow diagram 400, the genius 402 is defined as a person who has a grade greater than 99, or an IQ greater than 100. Furthermore, experience 404 is defined as knowing C programming language, or having 2 years of experience in C++ and 1 year experience in Java.

Additionally, as shown in the flow diagram 400, for each leaf (i.e. a condition with no operators, such as 1 year experience in Java), there are "odds" that the requirement will be true. In the present embodiment, the odds represent the likelihood that the condition will be true in the population. Further, such present embodiment may not necessarily be updated dynamically and may not be complementary to 1 for each set of its subordinates. Additionally, in one embodiment, each of the actions in the leafs that returns true or false may cost a certain execution time, as described in Table 5 below.

TABLE 5

| Question | Odds (P) | Cost (C) |
|---|---|---|
| Relative | 1% | 1 |
| IQ > 100 | 20% | 100 |
| Grad e > 99 | 50% | 100 |
| Java = 1 | 25% | 60 |
| C++ = 2 | 15% | 20 |
| C | 45% | 10 |

Additionally, it should be noted that, in the context of the present embodiment, a number of assumptions have been made. First, it has been assumed that each one of the requirements may be distributed normally in the population. Further, it has been assumed that the requirements may not necessarily be dependent on each other. In addition, it has been assumed that the given data may only be for leafs and not necessarily for junctions. In the present embodiment, a junction is a condition that is composed of more than one requirement and a Boolean operator.

Furthermore, it has been assumed that, under a certain node, there may only be one type of operator (OR or AND), but not both. Additionally, it has been assumed that the cost of a junction may include an epsilon. Further, it has been assumed that, for each node, the number of subordinates may not be limited. Finally, it has been assumed that the search may be recursive and that, in each junction, the data available may be of the direct subordinates.

Of course, these assumptions have only been made in the context of the present embodiment. In other embodiments, such assumptions may not necessarily be made, and thus, such assumptions should not be construed as limiting in any manner.

Further, it should be noted that one goal in the current embodiment is to obtain to a decision on whether to accept the candidate who is interviewing, in the cheapest way. It should also be noted that the algorithm may determine, for each node, what the order of subordinates to be checked is (e.g. which node to check first, and if the result is not true, what is the next node). Furthermore, the algorithm may optimize a loaded system when the number of candidates for the job is close to infinity (minimum expectation of decision time).

Additionally, it should be noted that, in the present embodiment, if a node under OR is true, no other nodes (under the same father node) should be checked. Additionally, if a node under AND is false, none of the remaining nodes should be checked.

Furthermore, in the present embodiment, an ODDS-COST algorithm may be provided. For example, an ODDS-COST algorithm may be utilized to optimize the order of the condition $(A \times B) \| (C \times (D \| E))$. In one embodiment, for each parameter k, it may be known that Pk is the probability for a "True" result. Additionally, it may be known that P'k is the probability for a "False" result (e.g. p=1−Pk). Furthermore, it may be known that Sk is the cost for testing k, for example.

In one embodiment, a first stage may involve finding the best testing sequence. For N parameters, there may be N! possible different sequences. However, there are logical limitations that reduce the number of possible sequences. For example, for A & (B||C), B||C may be required to "stay together" because of the AND operator. Thus, the places of B and C may be switched, in addition to that of A and (B||C), which leaves 2!*2! possibilities: ABC, ACB, CBA, and BCA.

In one embodiment, two alternatives may be available to choose the cheapest sequence, as will be described in more detail below. The first possibility is to calculate average cost according to Algorithm 1 for each test sequence and choose the cheapest. The second possibility is to get the cheapest sequence according to Algorithm 2.

Algorithm 1 involves first creating all DNF possible permutations for the Boolean statement. The cheapest DNF may then be chosen according to the truth table. Finally, the junction P, C may be calculated. For example, for a Boolean condition that is C&(D||E), the possible DNFs are: CD||CE, CE||CD, DC||CE, EC||CD, DC||EC, CD||EC, EC||DC, and CE||DC.

In another embodiment, the truth table tree of the sequence may be spanned. For example, one of the possible test sequences for the condition $(A \times B) \| (C \times (D \| E))$ can be EDCBA. Thus, it has $2^5$ possible combinations of answers. However, while checking the sequence, some combinations may provide a result before the five tests. For example, if E=0, then D=1, and then C=1, the check may be stopped.

Moreover, if E=1, then D does not have to be checked. Thus, all of the "answer" sequences may be found within the specific testing sequence that lead to an answer, in addition to finding the probability and cost for each one of them. Table 6 illustrates a truth table for the test sequence EDCBA, in accordance with one embodiment.

TABLE 6

| Answer sequence for EDCBA | probability | cost |
|---|---|---|
| 1  00_0_ | P'e × P'd × P'b | Se + Sd + Sb |
| 2  00_10 | P'e × P'd × Pb | Se + Sd + Sb + Sa |

TABLE 6-continued

| | Answer sequence for EDCBA | probability | cost |
|---|---|---|---|
| 3 | 0100_ | P'e × Pd × P'c × P'b | Se + Sd + Se + Sb |
| 4 | 01010 | P'e × Pd × P'c × Pb | Se + Sd + Sc + Sb + Sa |
| 5 | 011_ | P'e × Pd × Pc | Se + Sd × Sc |
| 6 | 1_00_ | Pe × P'c × P'b | Se + Sc + Sb |
| 7 | 1_010 | Pe × P'c × Pb | Se + Sc + Sb + Sa |
| 8 | 1_1_ | Pe × Pc | Se + Sc |

It is important to note that, in Table 6, "_" indicates that no test is required, and "Ø" indicates that a test is required in order to determine the result. However, the answer does not matter. It should also be noted that, in line "1" of Table 6, because (D||E) is false, there may be no need to check C. Additionally, because B is false, there may be no need to check A. Furthermore, in line "2" of Table 6, because B is true, A should be checked (so its cost is added to the total cost). Again, however, the result may not matter and its probability may be ignored.

Furthermore, with respect to Table 6, even though there are 32 potential "answer sequences," only 8 should be considered. A programmer may represent the equation/problem in a way such that the programmer may be able to tell when a test may be skipped. Furthermore, the criteria for skipping a test may be either that a solution is already available (e.g. in line "8" for A & B), or that there is no need to keep checking for the specific stage (e.g. in line "8" for D). It should further be noted that, for parameters that repeat themselves, the P=1 and C=0, with the exception of the first time.

Table 7 shows a truth table of the original logical statement C&(D||E), in accordance with one embodiment.

TABLE 7

| | Answer sequence for C & (D||E) | probability | cost |
|---|---|---|---|
| 1 | 0_ _ | P'c | Sc |
| 4 | 100 | PcP'd | Sc + Sd + Se |
| 5 | 11_ | PcPd | Sc + Sd |

Table 8 shows a truth table for the DNF of C&(D||E), in accordance with one embodiment.

TABLE 8

| | Answer sequence for CD||CE | probability | cost |
|---|---|---|---|
| 1 | 0_0_ _ | P'c*1 | Sc + 0 |
| 2 | 0_00 | Cannot be | Cannot be |
| 3 | 100_ | Cannot be | Cannot be |
| 4 | 1010 | PcP'd*1 | Sc + Sd + 0 + Se |
| 5 | 11_ | PcPd | Se + Sd |

In yet another embodiment, once the probability and cost of each possible "answer sequence" of a specific "testing sequence" is found, the average cost may be calculated by weighing each cost by the corresponding probability. For example, the average cost for the testing sequence EDCBA is P'e X P'd X P'b X (Se+Sd+Sb)+P'e X P'd X PbX (Se+Sd+Sb+Sa)+P'e X Pd X P'c X P'bX (Se+Sd+Sc+Sb)+P'eXPdX P'c X PbX (Se+Sd+Sc+Sb+Sa)+P'e X Pd X Pc X (Se+Sd+Sc)+Pe X P'c X P'b X (Se+Sc+Sb)+Pe X P'c X Pb X (Se+Sc+Sb+Sa)+Pe X Pc X (Se+Sc). Thus, the DNF with the cheapest average cost may be chosen.

Algorithm 2 may be used if the permutation number of the DNF in Algorithm 1 is too large, for example. Algorithm 2 involves creating a DNF, then determining the order of the OR statements inside the DNF, and then determining the order of the AND statements inside the DNF (e.g. p=1−P).

For example, in one embodiment, the original tree may be (A & B)||(C & (D||E)). Thus, in step one, the DNF created is A&B||C&D||C&E. It should be noted that C does not have to be received twice.

Once the DNF is created, the order of the OR statements inside the DNF are determined. In the present example, the order of the OR statements is determined by creating a fraction for each AND statement (e.g. C/P), and choosing the minimal fraction (e.g. similar to getting the maximal P and minimal C). Thus, the first OR equals MIN(Ca+Cb/PaPb, Cc+Cd/PcPd, Cc+Ce/PcPe). In one embodiment, the result of the first OR may be Cc+Cd/PcPd i.e. "C&D" will be chosen to be first, for example. It should be noted that, if two fractions return 0, the choice may be made according to the maximal P. In addition, because C was already checked in this order, the cost of C becomes 0.

Furthermore, in the present example, the second OR equals min(Ca+Cb/PaPb, Ce/PcPe). In one embodiment, the result of the second OR may be Ce/PcPe (i.e. "C&E" may be chosen to be second), for example. Finally, in the present example, the third OR equals A&B. Thus, the order of ORs is C&D||C&E||A&B, for example.

Once the order of the OR statements inside the DNF is determined, the order of the AND statements inside the DNF may be determined. Thus, for the order of parameters inside the AND statements, minimal cost and maximal P' may first be chosen (e.g. probability to return with false). For example, for A&B, the min(Ca/P'a, Cb/P'b) is determined, where P'=1−P.

An example of code generation for the DNF (C&D||C&E||A&B), in accordance with one embodiment, is shown below in Table 9.

TABLE 9

| |
|---|
| If(C!=null) C=getC( ); |
| If(C) |
|   If(D!=null) D=getD( ); |
|   If(D)return true |
| If(C!=null) C=getC( ); |
| If(C) |
|   If(E!=null) E=getE( ); |
|   If(E)return true |
| If(A!=null) A=getA( ); |
| If(A) |
|   If(B!=null) B=getB( ); |
|   If(B)return true |
| return false |

In one embodiment, a second stage after the execution of algorithm 1 or 2 may involve calculating P (probability) and C (cost) for the junction. The data P,C of the junction may be used to determine the order of this junction and other junctions in the father condition (e.g. recursion).

In one embodiment, the cost of the junction may equal the average cost of the chosen sequence according to the calculation of the average cost in Algorithm 1, for example. Additionally, the probability of the junction may equal the sum of the probability of the true possibilities in a truth table, or according to the union and intersection of certain groups, for example.

For instance, in one embodiment, for A&B, the probability is PaPb; for A||B the probability is Pa+Pb−PaPb; for A||B||C the probability is Pa+Pb+Pc−PaPb−PaPc−PbPc−PaPbPc; for A & (B||C) the probability is Pa*(Pb+Pc−PbPc); for (C& (D||E))||(A&B) the probability is Pc(Pd+Pe−PdPe)+PaPb−Pc (PdPe−PdPe)PaPb; and Ptrue(C&(D||E)) equals Pc(Pd+Pe−PdPe) equals PcPd+PcPe−PcPdPe. The same result may be seen for the DNF form CD||CE according to groups is PcPd+PcPe−PdPePc, removing the groups intersections.

Additionally, in another embodiment, Algorithm 1 may be utilized when addressing C&(D||E), for example. As stated above Ptrue(C&(D||E)) equals Pc(Pd+Pe−PdPe) equals PcPd+PcPe−PcPdPe. Thus, Table 10 shows C&(D||E) in accordance with the present embodiment.

TABLE 10

| 1 | 0 | — | — |
| 2 | 1 | 0 | @ |
| 3 | 1 | 1 | — |

Thus, the possibilities that return true are 2, 3 (when @ is 1). Further, the probability for true of the whole statement is P2+P3=PcPePd'+PcPd=PcPe(1−Pd)+PcPd=PcPe−PcPePd+PcPd.

Furthermore, in another embodiment, if calculated according to the DNF, CD||CE is reflected in Table 11.

TABLE 11

| 1 | 0 | — | 0 | — |
| 2 | 1 | 0 | 1 | @ |
| 3 | 1 | 1 | — | — |

Thus, the possibilities that return true are 2, 3 (when @ is 1). Further, it the variable (e.g. C) repeats itself, then P=1, and C=0. Additionally, the probability for truth of the whole statement is P2+P3=PcPd'*1Pe+PcPd=Pc(1−Pd)Pe+PcPd=PcPd+PePc−PdPePc.

Figure 5:
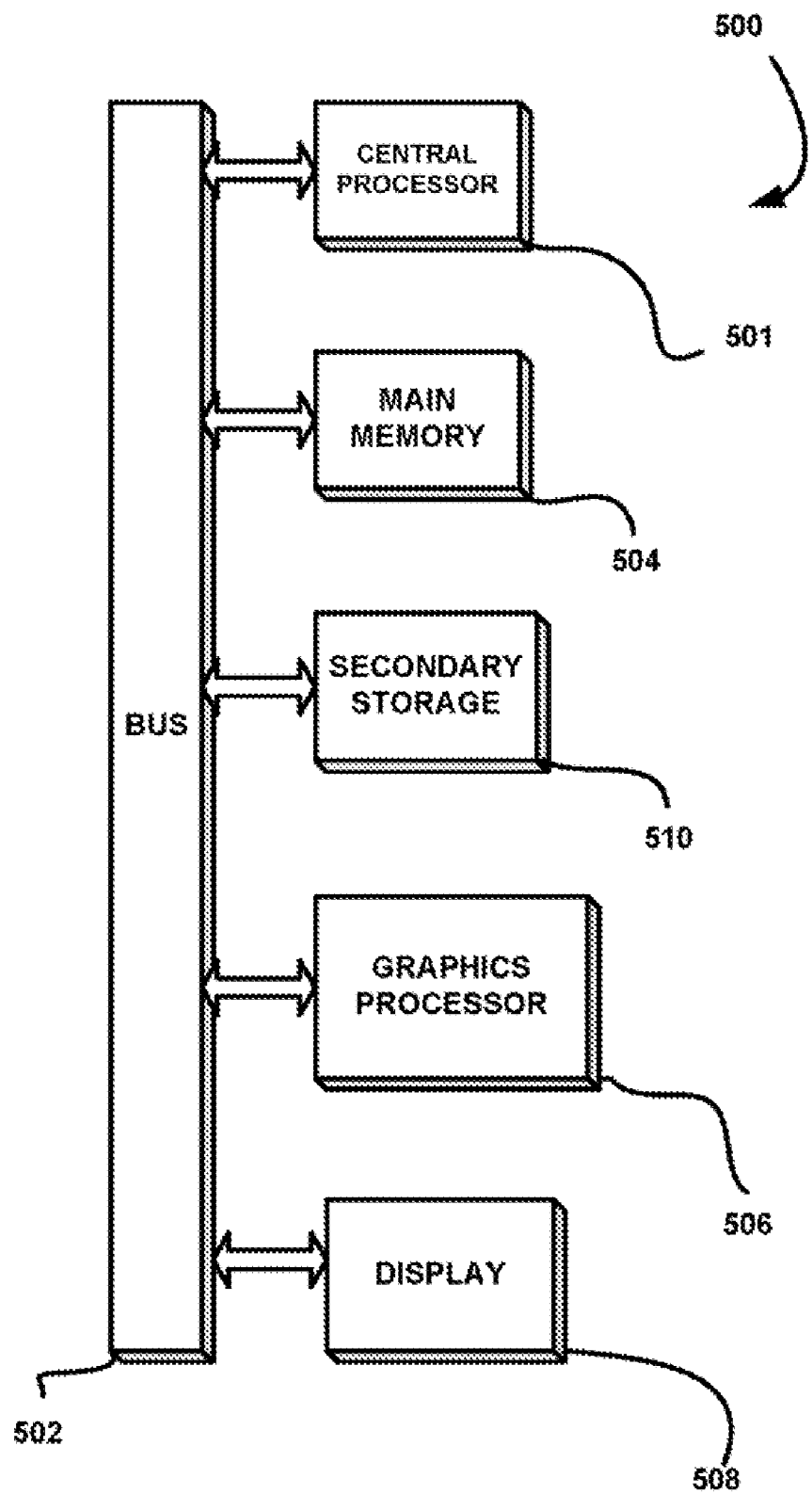
FIG. 5 illustrates an exemplary system, in accordance with one embodiment.

Further, it should be noted that, in another embodiment, the order of the Boolean rules in the Boolean condition mentioned in the context of FIG. 5 may be rearranged in the generated java code according to the associated cost and odds to them, for example.

To this end, a simple representation method of pricing logic together with optimized execution is provided in the context of real-time pricing of an event. Further, in one embodiment, a method for representing pricing logic is provided. For example, a PORI table may include statements that may represent any pricing logic. Additionally, the PORI statements may be composed of expressions that may be close to natural language and may be organized in a simple data structure characterized by reusability.

Furthermore, in one embodiment, optimized execution code for real-time pricing, or near real-time pricing is provided. For example, a PORI core processor may be capable of optimizing the execution of the pricing logic using pre-generation manipulation on the order of the Java code, promoting statements that are more likely to return a result in the minimal amount of time. Additionally, in one embodiment, a pre-runtime parsing of business logic may cut back the need of this computation during execution. The rule execution mechanism is simple and immediate. No parsing is necessarily required (since parsing is a pre-runtime process). In addition, next rule determination logic may already exists in the generated code. Finally, a search for a required rule may be based on a simple array retrieval. Additionally, during rule execution, invocation of certain logic may be done in O(1) and the rule result may cached.

Further, such PORI representation method for business logic may resemble functional languages (as PORI statement may be paralleled to a function with or without parameters), while also having a side effect and infrastructure (e.g. the PCP) that support statements execution in an event scope.

In another embodiment, given an event map and a rule name, any external code may use and run a PORI rule. Furthermore, in another embodiment, a PORI rule may accept input parameters. In addition, PORI rules may be called in late binding. Thus, the rule that is actually called and executed may be determined during runtime.

FIG. 5 illustrates an exemplary system 500, in accordance with one embodiment. As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the system 500 to perform various functions (those set forth above, for example). Memory 504, storage 510 and/or any other storage are possible examples of computer-readable media, any one or more of which may be used to store the PORI table and/or related data.

Figure 6:
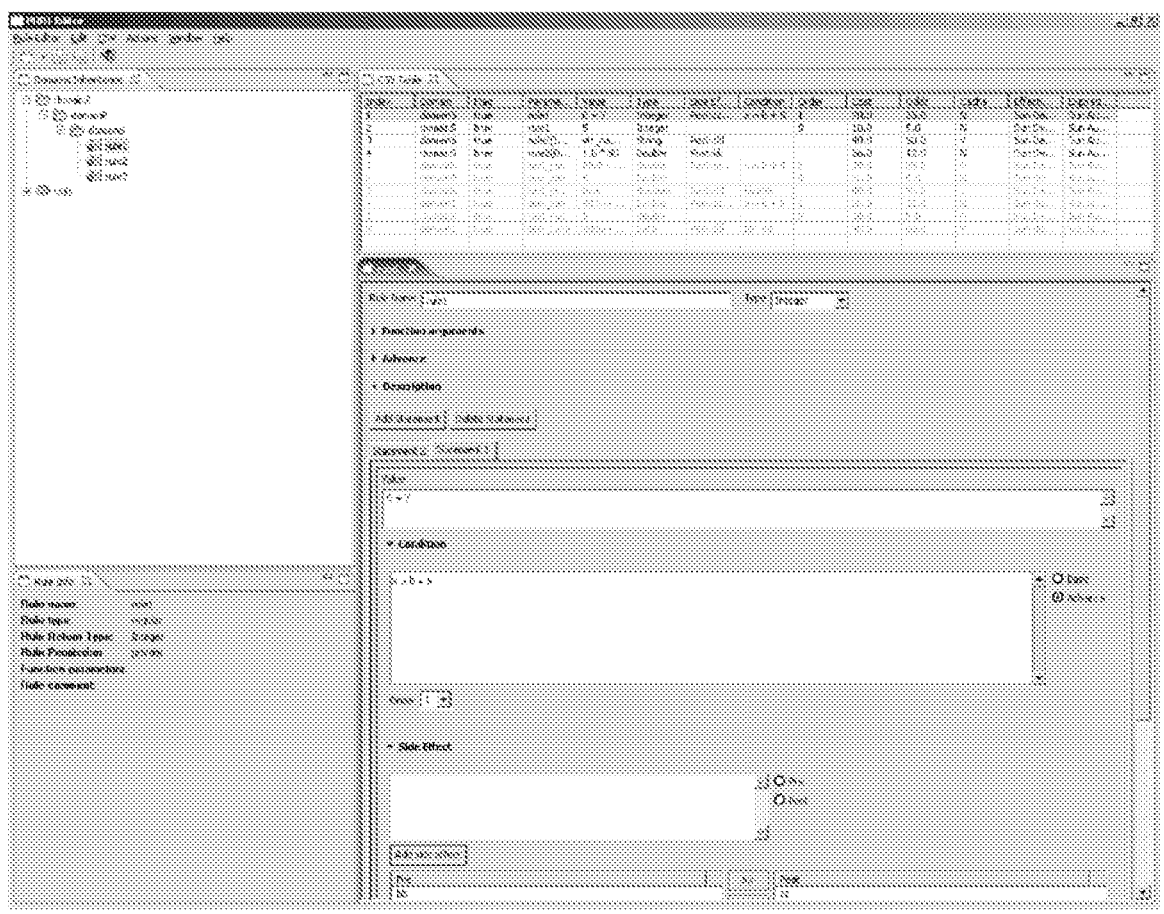
FIG. 6 shows one possible GUI client for a PORI table.
Figure 7:
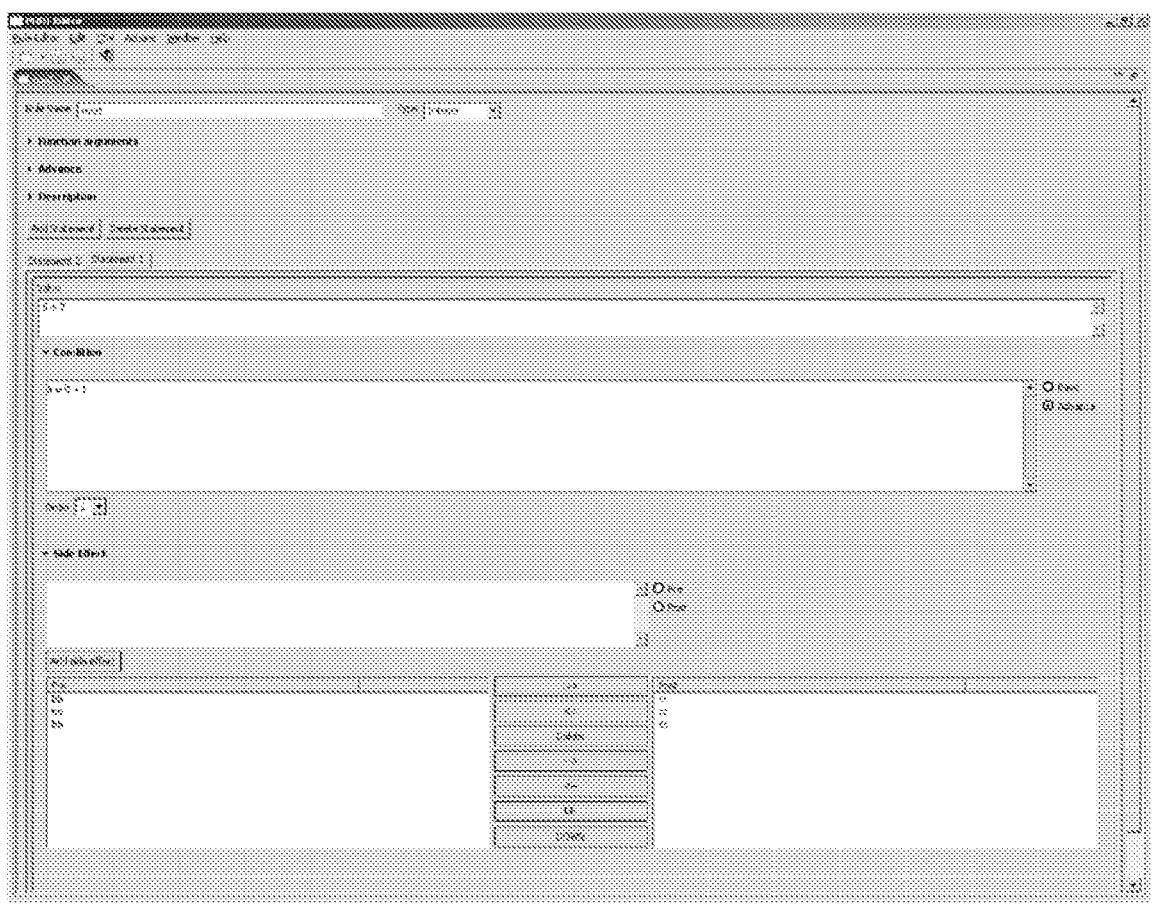
FIG. 7 illustrates one possible GUI client for a PORI rule.

FIGS. 6 and 7 illustrate various possible implementations for interfaces that allow for PORI table editing by a GUI client over a file or a database PORI table. As shown, a view of a whole PORI table is given together with a DOMAIN hierarchy and inheritance information. For each PORI rule, a statement window enables population of the statement expressions. Rule description and help is also provided. In another embodiment, rule syntax validation, rule creation, and rule execution may even be provided.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
including a plurality of rules in a pattern oriented rule implementation table that defines a side effect accompanying execution of a rule, wherein each row in the pattern oriented rule implementation table is regarded as a pattern oriented rule implementation (PORI) statement in a target domain, and each row includes a parameter expression value, a value expression value, a condition expression value, and an order expression value, where the parameter expression value is set according to the value expression value if the condition expression value equals true;
defining, utilizing a processor, a parameter to be applied utilizing the rule, the rule representing business logic;
generating optimized code for determining a price, based on the rule;
parsing the business logic before runtime to accelerate the determination of the price upon execution of the code;
determining a version of the rule during runtime, wherein versioning is defined by effective and expiration date expressions, such that execution of the rule to an event is based on a date of the event; and executing the code for determining the price.

2. The method of claim 1, wherein each of the plurality of rules is mapped to a class.

3. The method of claim 1, wherein the price is determined in real-time.

4. The method of claim 1, wherein the rule is determined during runtime.

5. The method of claim 1, wherein an order of the code is optimized.

6. The method of claim 1, wherein the rule is capable of calling another rule.

7. The method of claim 1, wherein the rule is one of a plurality of rules that are reused to determine different prices.

8. The method of claim 1, wherein the rule is used as a function with arguments.

9. The method of claim 2, wherein the class to which the rule is mapped implements corresponding rule logic.

10. The method of claim 1, wherein the pattern oriented rule implementation table represents logic adapted for concluding a price on a given event, and the pattern oriented rule implementation table includes a data structure for representing algorithms to determine a price on a financial transaction.

11. The method of claim 1, wherein the order expression value is evaluated and transformed into a valid number for determining an order of execution, a plurality of PORI statements with the same parameter expression value are regarded as a rule, and each value in a rule may invoke access to another rule.

12. The method of claim 11, wherein the pattern oriented rule implementation table includes the plurality of PORI statements and enables a defining of a side effect value before or after a return operation.

13. A computer program product embodied on a non-transitory computer readable medium, comprising:

computer code for including a plurality of rules in a pattern oriented rule implementation table that defines a side effect accompanying execution of a rule, wherein each row in the pattern oriented rule implementation table is regarded as a pattern oriented rule implementation (PORI) statement in a target domain, and each row includes a parameter expression value, a value expression value, a condition expression value, and an order expression value, where the parameter expression value is set according to the value expression value if the condition expression value equals true;

computer code for defining a parameter to be applied utilizing the rule, the rule representing business logic;

computer code for generating optimized code for determining a price, based on the rule;

computer code for parsing the business logic before runtime to accelerate the determination of the price upon execution of the code;

computer code for determining a version of the rule during runtime, wherein versioning is defined by effective and expiration date expressions, such that execution of the rule to an event is based on a date of the event; and computer code for executing the code for determining the price.

14. A system, comprising:

a pattern oriented rule implementation table including a plurality of rules representing business logic, the pattern oriented rule implementation table defining a side effect accompanying execution of a rule, wherein each row in the pattern oriented rule implementation table is regarded as a pattern oriented rule implementation (PORI) statement in a target domain, and each row includes a parameter expression value, a value expression value, a condition expression value, and an order expression value, where the parameter expression value is set according to the value expression value if the condition expression value equals true; and a processor adapted to:
  map each of the plurality of rules to a class for generating code;
  parse the business logic before runtime to accelerate a determination of a price upon execution of the code; and
  determine a version of at least one of the rules during runtime, wherein versioning is defined by effective and expiration date expressions, such that execution of the rule to an event is based on a date of the event.

* * * * *

UNITED STATES PATENT AND TRADEMARK OFFICE
CERTIFICATE OF CORRECTION

| | | |
|---|---|---|
| PATENT NO. | : 7,962,977 B1 | Page 1 of 1 |
| APPLICATION NO. | : 11/755653 | |
| DATED | : June 21, 2011 | |
| INVENTOR(S) | : Ben Ami et al. | |

It is certified that error appears in the above-identified patent and that said Letters Patent is hereby corrected as shown below:

On the Title page:
Last name item (12), please replace "Ami et al." with --Ben Ami et al.--.

Signed and Sealed this
Thirteenth Day of September, 2011

David J. Kappos
*Director of the United States Patent and Trademark Office*